(12) United States Patent
Cedilnik et al.

(10) Patent No.: US 10,209,138 B2
(45) Date of Patent: Feb. 19, 2019

(54) FILTERING DISTRIBUTED SENSING DATA

(71) Applicant: AiQ Dienstleistungen UG (haftungsbeschränkt), Böblingen (DE)

(72) Inventors: Gregor Cedilnik, Gäufelden (DE); Aldemar Dünkel, Stuttgart (DE); Alf Clement, Gärtringen (DE)

(73) Assignee: AiQ Dienstleistungen UG (haftungsbeschränkt), Böblingen (DE)

( * ) Notice: Subject to any disclaimer, the term of this patent is extended or adjusted under 35 U.S.C. 154(b) by 99 days.

(21) Appl. No.: 15/196,529

(22) Filed: Jun. 29, 2016

(65) Prior Publication Data

US 2017/0003177 A1 Jan. 5, 2017

(30) Foreign Application Priority Data

Jun. 30, 2015 (DE) .................. 10 2015 110 528

(51) Int. Cl.
*G01K 11/32* (2006.01)

(52) U.S. Cl.
CPC ........ *G01K 11/32* (2013.01); *G01K 2011/324* (2013.01)

(58) Field of Classification Search
CPC .................... G01K 11/32; G01K 2011/324
USPC ........ 702/130, 134, 189, 190, 191; 341/143; 374/161
See application file for complete search history.

(56) References Cited

U.S. PATENT DOCUMENTS

| | | | |
|---|---|---|---|
| 2009/0160688 A1* | 6/2009 | Hasegawa | G01P 15/12 341/143 |
| 2011/0019178 A1 | 1/2011 | Vlatas | |
| 2012/0139746 A1 | 6/2012 | Chen et al. | |
| 2014/0241396 A1 | 8/2014 | Shida | |
| 2015/0168467 A1* | 6/2015 | Haneda | G01R 23/165 702/191 |
| 2015/0241251 A1 | 8/2015 | Uno et al. | |

FOREIGN PATENT DOCUMENTS

| | | |
|---|---|---|
| EP | 0 692 705 A1 | 1/1996 |
| EP | 2 017 593 A2 | 2/2009 |
| EP | 2 772 738 A2 | 9/2014 |
| WO | WO2015060981 A1 | 4/2015 |

\* cited by examiner

*Primary Examiner* — John H Le
(74) *Attorney, Agent, or Firm* — Robert A. Blaha; Smith Tempel Blaha LLC (57) ABSTRACT

A distributed sensing device for determining a physical quantity which includes a measuring unit configured for measuring signals over time and space by distributed sensing, a determining unit configured for determining, based on the measured signals, data being correlated to the physical quantity, and a filtering unit configured for filtering the data to reduce noise and substantially preserve real features based on at least one filter parameter which is determined depending on the data which relate to the physical quantity at a plurality of different times.

19 Claims, 5 Drawing Sheets

FILTERING DISTRIBUTED SENSING DATA

CROSS-REFERENCE TO RELATED APPLICATIONS

This application claims the benefit of the filing date of German Patent Application No. 10 2015 110 528.4 filed Jun. 30, 2015, the disclosure of which is hereby incorporated herein by reference.

TECHNICAL FIELD

Embodiments of the invention relate to a distributed sensing device, to a method of determining a physical quantity by distributed sensing, to a program element, and to a computer-readable medium.

TECHNICAL BACKGROUND

Distributed temperature sensing (DTS) devices are opto-electronic devices which measure temperature by optical fibers functioning as linear sensors. Temperature values are recorded along the optical sensor cable as a continuous profile (temperature trace). A high accuracy of temperature determination is achieved over long distances. Measurement distances of many kilometers can be achieved. The temperature dependence of the Raman effect can be used for a DTS measurement.

A measurement of a physical quantity over space and time, like for example by a Raman-Optical Time Domain Reflectometer (OTDR) which measures the temperature profile over time along a fiber (Distributed Temperature Sensing, DTS) usually contains noise which reduces the ability to resolve small events, like temperature changes at some time or location, leading (in this example) to a limited temperature resolution or limitation in possible sensor length. Measures can be taken to increase the Raman signal or to reduce the noise contributors, but this can cause a high effort and have limits.

Another method is to filter the data to reduce the noise. Such filters may take a measurement trace D(x) along the position x and transfer it (according to the selected filter) into a trace D'(x), hopefully with the desired improvement.

One simple implementation would be to average each point with some neighbor points (sliding spatial averaging). Such a smoothed trace having less noise, but obviously reducing the ability to resolve sharp temperature changes over position is limiting the spatial resolution. EP 2,772,738 A2, US 2014/0241396 try to reduce the noise by spatial filtering, but preserve the spatial resolution of real events (like temperature hot spots or steps) where identified.

In general, by the nature of noise it is not possible to separate an unknown (random) noise from an unknown (real) signal if no additional data is available, so all filtering has to be based on some kind of assumption or knowledge about the noise and/or the signal. This applies to any kind of filter like Wavelet-based, Kalman filters etc. In the above mentioned example (EP 2,772,738 A2, US 2014/0241396) the assumption is basically that a real event in the signal along space, for example a hot spot, is significantly larger in amplitude than the noise, so that any event of sufficient amplitude is identified and that location on the trace is passed unfiltered, i.e. with full spatial resolution. Obviously this is not working with events that are comparably small (not significant) and therefore would get smoothed out. Another side-effect with such significance-based filters is that for example a growing hot-spot will transit from initially being unidentified and thus flattened by the filter to being identified and thus passed unfiltered (not smoothed out). Such a transition adds a non-real dynamic into the displayed hot-spot, for example by letting the hot-spot suddenly pop up, which can lead to wrong conclusions in some applications.

As noise limits accuracy of distributed sensing, it is generally desired to reduce it. Moreover, noise or distortions in the measurement signals of a distributed sensing device may result in an inaccuracy of the physical quantity to be determined.

SUMMARY

For mitigating problems in the prior art, there may be a need to enable determining a physical quantity by distributed sensing with high accuracy.

According to exemplary embodiments, there are provided a distributed sensing device, a method of determining a physical quantity by distributed sensing, a program element, and a computer-readable medium according to the independent claims.

According to an exemplary embodiment of the invention, a distributed sensing device for determining a physical quantity (in particular the value of a physical parameter; for instance, the physical parameter may be the temperature and the physical quantity may be a temperature value) is provided which comprises a measuring unit configured for measuring signals over time and space by distributed sensing, a determining unit configured for determining, based on the measured signals, data (in particular over time and space) being correlated to the physical quantity, and a filtering unit configured for filtering the data to reduce noise (i.e. distortions) and substantially preserve real features (like a narrow sharp temperature peak in the trace) based on at least one filter parameter which is determined depending on the data which relate to the physical quantity at a plurality of different times (a DTS trace is usually an average of for example 10 s, therefore not exactly a "point in time").

According to another exemplary embodiment of the invention, a method of determining a physical quantity by distributed sensing is provided, wherein the method comprises measuring signals over time and space by distributed sensing, determining, based on the measured signals, data being correlated to the physical quantity, and filtering the data to reduce noise and substantially preserve real features based on at least one filter parameter which is determined depending on the data which relate to the physical quantity at a plurality of different times.

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a non-transitory computer-readable medium (for instance a CD, a DVD, a USB stick, a floppy disk, a hard disk, or a cloud storage device) is provided, in which a computer program is stored which, when being executed by a processor (such as a microprocessor or a CPU), is adapted to control or carry out a method having the above mentioned features.

BRIEF DESCRIPTION OF THE DRAWINGS

The invention will be described in more detail hereinafter with reference to examples of embodiment but to which the invention is not limited.

DETAILED DESCRIPTION OF EXEMPLARY EMBODIMENTS

Data processing which may be performed according to embodiments of the invention can be realized by a computer program, that is, by software, or by using one or more special electronic optimization circuits, that is in hardware, or in hybrid form, that is by means of software components and hardware components.

In the context of the present application, the term "signals" may particularly denote raw measurement signals detected by an electromagnetic radiation detector of the distributed sensing device (like optical intensity, optical frequency and/or frequency shift relative to incident radiation (Brillouin scattering has a small bandwidth, and here not only the amplitude, but also the frequency or the frequency shift changes with the temperature and/or strain, in the Stokes signal as well as in the Antistokes signal)). Different signals may be portions of a set of detected signals which relate to different wavelengths or wavelength ranges of detected electromagnetic radiation. In terms of distributed sensing, different signals may relate to different wavelength sections of detected secondary electromagnetic radiation (in particular from inelastic scattering), one having an increased wavelength and another wavelength section having a decreased wavelength as compared to the (in particular monochromatic) primary electromagnetic radiation coupled into the fiber. A decreased wavelength may result from phonon annihilation (Antistokes process) within the fiber, whereas an increased wavelength may relate to a phonon creation (Stokes process).

In the context of the present application, the term "data" may particularly denote information indicative of the physical quantity and being derived from processing the signals in accordance with a predefined processing scheme (such as calculating a ratio between Stokes signal and Antistokes signal for different times and different spatial positions to thereby determine a spatial and temporal temperature trace). The data may hence be obtained by processing the signals to determine still noisy data, for instance still noisy physical quantities along space and time, respectively.

The term "filtering the data" may particularly denote modifying or manipulating the determined data by a filtering algorithm or a filtering calculation for improving the quality of the data in terms of their capability of delivering relevant information concerning the physical quantity. The filtering may be performed in such a manner that distortions or noise along a trace of the physical quantity to be determined become smaller, e.g. are smoothed (for instance by selective averaging limited to noisy data portions apart from other data portions relating to one or more events or real features to be detected). Filtering raw data (containing noise) enables one to obtain refined data (containing less noise).

The term "filter parameter(s)" may particularly denote one or more values of one or more coefficients being indicative of which portions of the data are to be filtered and which other portions of the data are not to be filtered, and/or to which extent which portions of the data are to be filtered (i.e. gradually). This may involve a specification according to which averaging algorithm certain data portions are to be filtered (for instance over which spatial and/or temporal width averaging is carried out, how many and/or with which weight neighbored data points are considered for an averaging of a respective data point, a function or function parameter (such as a Gaussian distribution or its width) according to which a respective data point is averaged considering surrounding data points, a spline curve used for filtering, etc.).

The term "noise" may particularly denote any distortion of the measured signals translating to a corresponding distortion of the data derived from the signals. Noise is therefore not based on a real feature to be measured or determined. In particular, such noise may comprise an uncorrelated, statistical contribution to a measured signal and data derived therefrom.

The term "real features" may particularly denote a defined phenomenon or event or state at a certain point of time or in a certain temporal range and at a certain position or in a certain spatial range of the fiber to be analyzed by distributed sensing. For instance, the real feature may be a hotspot or a coldspot in terms of Distributed Temperature Sensing, or an acoustic or vibrational event in terms of Distributed Acoustic Sensing.

In the context of the present application, the term "distributed sensing" may particularly denote a continuous distributed measurement along the length of a sensing fiber. For instance, light backscattered from the fiber may be used to deliver strain data and/or temperature data. In particular, a physical quantity may be determined in a distributed way over an extended physical domain (such as space) by distributed sensing. A distributed sensing device may use electromagnetic radiation as a probe for sensing a distribution of the physical quantity along the physical domain, in particular along a fiber in which the electromagnetic radiation propagates and is scattered. Thus, the mentioned distributed sensing device may comprise an electromagnetic radiation source configured for generating primary electromagnetic radiation coupled into the fiber, and may comprise an electromagnetic radiation detector configured to detect secondary electromagnetic radiation generated in response to the coupling of the primary electromagnetic radiation into the fiber.

The term "fiber" may particularly denote a member (in particular an optoelectronic member) capable of guiding electromagnetic radiation to propagate along a defined path through the fiber. A fiber made for instance of fused silica glass may be capable for transporting visible and infrared radiation. Hence, a fiber may be denoted as a dielectric waveguide at least partially transparent for electromagnetic radiation.

The term "electromagnetic radiation" may particularly denote photons of a suitable wavelength capable of propagating through a fiber. Optical radiation may be in a range between 400 nm and 800 nm, i.e. may be in the visible region. Infrared radiation usable for partial discharge detection may be in a range between 800 nm and 5000 nm. For instance, 1550 nm is a suitable measurement wavelength. Particularly appropriate wavelengths for distributed sensing are in a range between 850 nm and 1700 nm.

Before describing the figures in detail, some basic considerations of the present inventors will be summarized based on which exemplary embodiments have been developed.

Exemplary embodiments are based on the consideration that quality of a distributed sensing measurement can be improved by using one or more filtering parameters for filtering distributed sensing data which are determined on the basis of the data going back to measurement signals as measured at different times (i.e. at different points of time and/or within different temporal ranges, at each position). Thus, in contrast to the use of static or constant filter parameters, filtering may be performed in a dynamic way taking into account information from the time dependence of the data obtained from measured signals itself. By taking this measure, real features can be maintained while noise or distortion may be suppressed.

The described data modification architecture may be performed in very different ways, i.e. including but not limited to a significance detection (i.e. identification of events that are above noise floor) and simple averaging (i.e. of variable spatial resolution and/or variable measurement time). Exemplary embodiments of the invention may apply the described kind of dynamic filtering to all kind of filters like Kalman filters, or wavelet transformation based filters. However, the filter parameter(s) (like which wavelet type is used, where and when, or which coefficients are modified in which way and at which location and time) may be variable in space and time and derived from the measurement signals relating to more than one time (and preferably, although optionally, additionally relating to more than one location).

In the following, further exemplary embodiments of the device, the method, the program element, and the computer-readable medium will be explained.

In an embodiment, the filtering for refining the signal to noise ratio of the physical quantity (such as a temperature trace) to be determined may be carried out after having determined the raw data indicative of the physical quantity from the raw measured signals (i.e. the raw data including noise may be filtered). For the example of Distributed Temperature Sensing (DTS), this means that the Raman signals (Stokes and Antistokes) may be measured at different times and for different positions along a measuring fiber. In accordance with Raman theory, the temperature trace (i.e. the temperature distribution along the fiber at a time) may then be determined based on a ratio between the Stokes signal and the Antistokes signal, as known by those skilled in the art. Thereafter, the determined spatial distribution of the physical quantity (in particular the temperature trace) may be smoothed by filtering. In this context, it may be advantageous that one or more real features are identified along the determined raw spatial distribution of the physical quantity, for instance based on a threshold analysis of a spatial or temporal derivative, preferably averaged over space and/or time, of the determined raw spatial distribution. This determined information with regard to probable positions of real features in the determined raw spatial distribution may then be used for adjusting the filter parameter(s) so that filtering of the raw spatial distribution for obtaining a refined spatial distribution is limited to portions of the trace being free of identified real features or events. This may allow to improve the resolution to suppress noise by filtering in portions apart from the real features while preventing that real features are smeared out by a locally (in terms of time and/or space) undesired filtering (in particular averaging) over sections which include both real features and noise.

However, as an alternative, it may also be possible to carry out the filtering not on the basis of the determined raw trace of the physical quantity over space or time, but in contrast to this to carry out the filtering earlier in the data processing chain, for instance to filter the ratio between Stokes signal and Antistokes signal. Furthermore, it may also be possible to filter the measured raw signals before calculating the physical quantity. In the latter scenario, care shall however be taken that the filtering of this raw signals does not smear out information (features of interest).

In an embodiment, the filtering unit may be configured for determining the at least one filter parameter varying over the plurality of different times. This variation over time (and highly preferably, although optionally, also over space) of the measurement may depend on what is happening there and then, as indicated by the measured signals or the data derived therefrom.

In an embodiment, the filtering unit may be configured for determining the at least one filter parameter depending on the data which relate to the physical quantity at the plurality of different times (during the measurement) and at a plurality of different spatial positions (along the measurement fiber). In other words, the filtering unit may be configured for determining the at least one filter parameter depending on the data being determined based on the signals measured at the plurality of different times and depending on the data being determined based on the signals measured at a plurality of different spatial positions. In particular, the at least one filter parameter may be determined separately for each position and for each time. By considering data determined based on signals measured at different times and at different locations along the fiber, a broader data basis for the decision may be provided concerning which portions of the data relate to an event, i.e. to a real feature, and which not. With such a space-time filter, the filter parameters may be determined depending on the measurement data $D(x_{range}, t_{range})$ in a range $t_{range}$ $x_{range}$ which contains more than one location (or data point) x and in a range which contains more than one time (or time index) t. This highly preferred embodiment of the invention may perform selective filtering on data $D(x,t)$ which is depending on location x and time t to reduce the noise while mainly preserving real features, where the filter parameters may be determined depending on the measurement data $D(x_{range}, t_{range})$ in a range $t_{range}$ which contains more than one time (or time index) t. Thus, the analysis may be carried out highly advantageously in space and time. Carrying out the analysis in space only (where data at another time, like from the previous trace, may have no impact; as in below described variant A without "average over time the spatial-derivative of the trace") may already be advantageous. Carrying out the method in time only (where data from any other point has no impact; as in variant B but without "averaging over space the temporal-derivative of the traces") may be advantageous as well. However, the combination of the execution of the analysis in time and space may allow one to obtain significantly improved results.

In an embodiment, the filtering unit may be configured for determining the at least one filter parameter varying over the plurality of different times and varying over the plurality of different spatial positions. Thus, the dynamic determination of the filter parameter(s) may be applied in both the time domain and the space domain.

In an embodiment, the filtering unit may be configured for filtering the data by averaging at least a part of the data over at least one of space and time. Hence, the measured data may be smoothed by averaging over space and/or time.

In an embodiment, the filtering unit may be configured for filtering the data by replacing at least a part of the data by at least one function (in particular a function over space and/or time). Thus, additionally or alternatively, the noisy data as directly obtained from the measured signals may be smoothed by replacing at least a portion of the data by one or more mathematical functions (which may be parameterizable to obtain a proper match between the parameterized function and the respective data part). Such a function may approximate at least a section of the data in a noise-free or distortion-free state.

In an embodiment, the filtering unit may be configured for filtering the data by replacing at least a part of the data by at least one fitted shape. Thus, additionally or alternatively, the measured data may be smoothed by replacing data by one or more fitted shapes. For example, a least squares fit may be performed for at least a section of the data to approximate the data in a noise-free or distortion-free state.

In an embodiment, the filtering unit may configured for filtering the data by transforming at least a part of the data by a transformation, in particular by a wavelet transformation and/or a Fourier transformation. In such an embodiment, sub-procedures of transforming the data from an original domain into a transformed domain, modifying the data in the transformed domain, and back-transforming the modified data into the original domain may be carried out. For instance, it may be possible to transform portions of the trace in wavelets, to subsequently cut out portions of the wavelet, and to further subsequently carry out a back transformation. By taking this measure, a smoothing of the data may be obtained.

In an embodiment, the filtering unit may be configured for filtering the data by carrying out Kalman filtering. Kalman filtering, also denoted as linear quadratic estimation (LQE), is an algorithm that uses a series of measurements observed over time, containing noise (random variations) and other inaccuracies, and produces estimates of unknown variables that tend to be more precise than those based on a single measurement alone. More formally, the Kalman filter may operate recursively on streams of noisy input data to produce a statistically optimal estimate of the underlying system state. Extensions and generalizations of Kalman filters may be used (such as the extended Kalman filter and the unscented Kalman filter which work on nonlinear systems).

In an embodiment, the filtering unit may be configured for changing, in particular omitting or reducing, the filtering for a part of the data for which or around which the occurrence of a real feature has been identified. More specifically, the filtering unit may be configured for reducing noise and substantially preserving real features by smoothing a part of the data in a more pronounced way than another part of the data belonging to at least one identified real feature. The degree of smoothing may be larger apart from the identified features. In one embodiment, the part of the data belonging to the identified feature(s) may be completely excluded from filtering. Filtering procedures, such as averaging data points, could reduce the quality rather than improving it in sections relating to a real feature, in particular when a real feature is very narrow (such as a spatially and/or temporarily very limited hotspot). Omitting or at least reducing the filtering selectively in such portions of the data set may avoid that.

Figure 11:
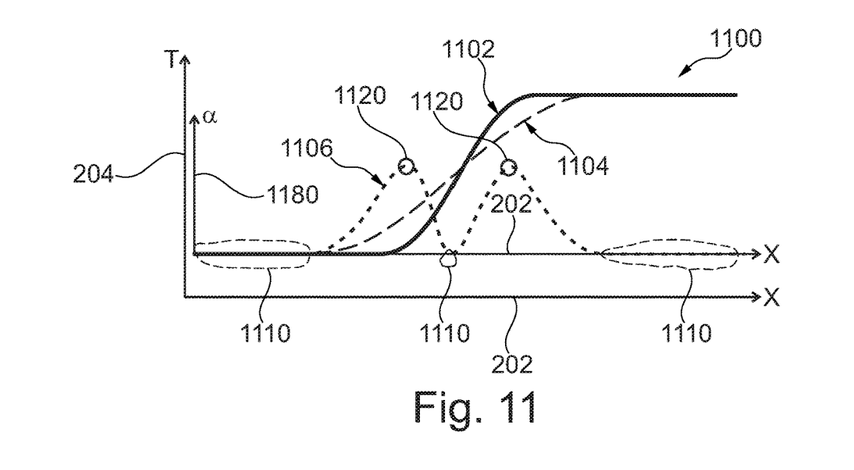
FIG. 11 illustrates a diagram showing a degree of filtering used for filtering according to an exemplary embodiment of the invention.

In an embodiment, the filtering unit may be configured for filtering the data in accordance with a degree of filtering (see reference numeral 1106 in FIG. 11) determined based on a difference, in particular an absolute value of a difference, between the unfiltered data (see reference numeral 1102 in FIG. 11) and the data being uniformly filtered regardless of an occurrence of a real feature (see reference numeral 1104 in FIG. 11). More particularly, the filtering unit may be configured for performing the filtering based on the degree of filtering in such a way that the filtering changes respective data portions the larger, the smaller the difference (in particular the absolute difference) and/or the filtering changes respective data portions the smaller, the larger the difference (in particular the absolute difference) is for the respective data portion. Advantageously, the filtering unit may be configured for determining the degree of filtering based on a difference between the unfiltered spatial data averaged over time and the uniformly filtered spatial data averaged over time. The described procedure of determining the filter parameters may be an alternative to the calculation of the mathematically first derivative of the data. Under many circumstances, the presently described embodiment may provide even better results.

In an embodiment, the filtering unit may be configured for identifying the occurrence of a real feature based on an analysis of a derivative of the data. Analyzing the (in particular first) derivative of the measured data rather than analyzing the data itself in terms of identifying a real feature to be detected has turned out to be advantageous, since this approach may be more sensitive in particular to changes of the signal. It is particularly preferred where the filtering unit may be configured for identifying the occurrence of a real feature by averaging a spatial derivative of the data over time and/or by averaging a temporal derivative of the data over space, since this may further increases the reliability of the feature detection by reducing the noise floor.

More generally, it may be possible to average a feature identification criterion (such as a derivative) derived from data over space (at one time) and/or from data over time (at one position in space).

In an embodiment, the filtering unit may be configured for identifying the occurrence of a real feature by searching the data for events for a part of even each of the plurality of times, which events prevail over at least a predetermined temporal range. This may be performed by carrying out a threshold analysis. For example, the presence of a real feature may be identified when an averaged derivative of a determined raw trace of the physical quantity shows a value above a predetermined threshold value. When the potential feature lasts for a certain time, there may be a high probability that the potential feature is a real feature rather than a noise related artifact. For instance, a feature may need to last long enough so that it is not averaged out compared to noise floor.

In an embodiment, the filtering unit may be configured for identifying the occurrence of a real feature by searching the data for events for a part or even each of the plurality of spatial positions, which events prevail over at least a predetermined spatial range. When the potential feature can be seen in a certain spatial range, there may be a high probability that the potential feature is a real feature.

The latter two embodiments (one finding spatial features, the other one finding temporal features) may be advantageously combined to further reduce noise.

In an embodiment, in which the identification of one or more real features may be carried out by a threshold analysis, one or more corresponding threshold values may be fixedly defined identically for all distributed sensing devices manufactured at a factory site. Alternatively, the one or more threshold values may be fixed at a factory site for a certain distributed sensing device individually, wherein different distributed sensing devices can be programmed with different sets of threshold values (for instance individually in accordance with an individual noise level of a certain distributed sensing device). Further alternatively, the one or more threshold values may be adjusted (once or repeatedly) at a user site for a certain distributed sensing device in accordance with a present noise level of this distributed sensing device as measured at the user site.

In another embodiment, the filtering unit may be configured for identifying the occurrence of a real feature based on a pattern recognition in the data, in particular based on a cross correlation between a respective portion of the data and a predefined pattern being indicative of a real feature. Hence, as an alternative to the previously described calculation of a derivative and execution of a threshold analysis, it may also be possible to identify an event or a real feature by pattern recognition in a determined raw trace of the physical quantity, wherein the presence of a predefined pattern at a certain position of the raw trace is interpreted as a real feature. For example, a cross correlation of a sought pattern with the data may be calculated. One or more sections of high correlation of the result may then be interpreted as the presence of a real feature. When the cross correlation is calculated in space, averaging over time, implementing a spline curve, etc. may be possible.

Identification of an event or a real feature may also be carried out in a transformed space or domain (for instance after having carried out a Fourier transformation).

In an embodiment, the at least one filter parameter may be indicative of a degree according to which a corresponding part of the data is modified by the filtering. For example, the one or more filter parameters may be indicative of how much spatial and/or temporal averaging occurs at which data section.

In an embodiment, the determining unit may be configured for determining the physical quantity based on the measured signals, in particular by evaluating the measured signals in term of a predefined theory (such as Raman theory) or model (for instance an empirical model). For the example of Distributed Temperature Sensing, the Stokes and Antistokes backscatter from a medium (like an optical fiber) may be both measured. They may differ in wavelength so that suitable filters separate both. They may be measured for instance by two detectors (one for the Stokes signal and one for the Antistokes signal) or one detector in a sequence (where the detector is switched either to the Stokes signal or to the Antistokes signal). The temperature may then be calculated from the ratio of the Stokes signal and Antistokes signal. The Antistokes signals and the Stokes signals may have different relative sensitivities (i.e. the relative change per degree Celsius temperature change) so that the ratio may also bear the temperature information.

In an embodiment, the physical quantity may be a temperature, a strain or a vibration-related quantity of a fiber. In particular, it may be a temperature distribution, a strain distribution or a vibration-related quantity distribution along the fiber of the distributed sensing device. As an example, the physical quantity may be a temperature trace along a fiber, measured over time by DTS. As another example, the physical quantity may be a loudness trace as measured by DAS. A vibration-related quantity may be an amplitude indicative of vibration, a root mean square indicative of vibration, and/or a loudness. Each of these vibration-related quantities may be per frequency or frequency range. Correspondingly, the device may be configured as one of the group consisting of a Distributed Temperature Sensing (DTS) device, a Distributed Acoustic Sensing (DAS) device, a Distributed Vibration Sensing (DVS) device, and a Distributed Temperature and Strain Sensing device (DTSS). Embodiments of the invention may also be applicable to B-OTDR (Brillouin Optical Time Domain Reflectometry) that may measure two or more correlated quantities like Stokes and Antistokes frequency shifts or their amplitudes. By B-OTDR, strain may be measured.

An exemplary embodiment of the invention may implement an analysis over space and time of the traces from Distributed Optical Sensing or related technologies to identify events in space and/or time. Where no events are identified, a different filtering may be used than where events are identified.

Filtering may be sliding averaging over space and/or time, i.e. over neighbor points and/or previous traces. Filtering may also be wavelet filtering, Kalman filtering or any transformation from the measurement data (over space and/or time).

Identification may be finding events (such as temperature steps, peaks, patterns or states) that significantly emerge out of the noise or may be correlating the data with an expected pattern (i.e. a pattern search; for example for a characteristic temperature profile), wherein the search may be in a transformed data space (such as Fourier transformed, wavelet transformed, etc.).

A limit for noise versus significance may be determined beforehand, for example based on noise level of the instrument series or individually determined in factory or derived from actual measurement data.

In accordance with a preferred embodiment of the invention, a space-time significance filter may be provided which enables an improved temperature resolution. Such an architecture may also allow to better preserve detectability of (in particular quasi-static) weak events. Such a calculation scheme may in particular be applicable to all types of measurements of a physical quantity over both space and time where the average of the physical quantity over space and/or time maintains a meaning (like temperature in DTS or strain in B-OTDR, or acoustic loudness in DAS). Such an architecture may in particular be useful with high precision where the physical quantity does not change too quickly along space and time simultaneously.

A calculation flow according to an exemplary embodiment may be as follows:

(1) Calculate the spatial derivative of the logarithmic ratio between the Stokes signal and the Antistokes signal (or the final temperature) along trace, in particular as a difference between a strongly smoothed trace and a not or weakly smoothed trace;
(2) Average the result of procedure (1) over time, wherein this averaging can for instance be a linear averaging or an exponential averaging. It may for instance also be possible to start with a linear averaging and, after a number of traces, to switch to exponential averaging (thereby applying adaptive learning);
(3) Calculate a limit that increases with the loss (noise) along the trace;
(4) Subtract the limit from the average of (2);
(5) Calculate filtered logarithmic ratio (wherein certain portions may be not or weakly filtered, and other portions may be strongly filtered).

Such an architecture may have the benefit that it may be possible to detect weak temperature events more reliably (from out of noise). It may furthermore be possible to reduce trace-to-trace temperature jumps of peaks near filter threshold. It may also be advantageous that this procedure keeps weak temperature peaks unfiltered so that they stay visible with full spatial resolution. The described procedure may keep weak temperature steps at full spatial resolution and is easy in implementation.

The aspects defined above and further aspects of the invention may be apparent from the examples of embodiment to be described hereinafter and are explained with reference to these examples of embodiment.

The illustration in the drawing is diagrammatic and not necessarily to scale. In different drawings, similar or identical elements are provided with the same reference signs.

Figure 1:
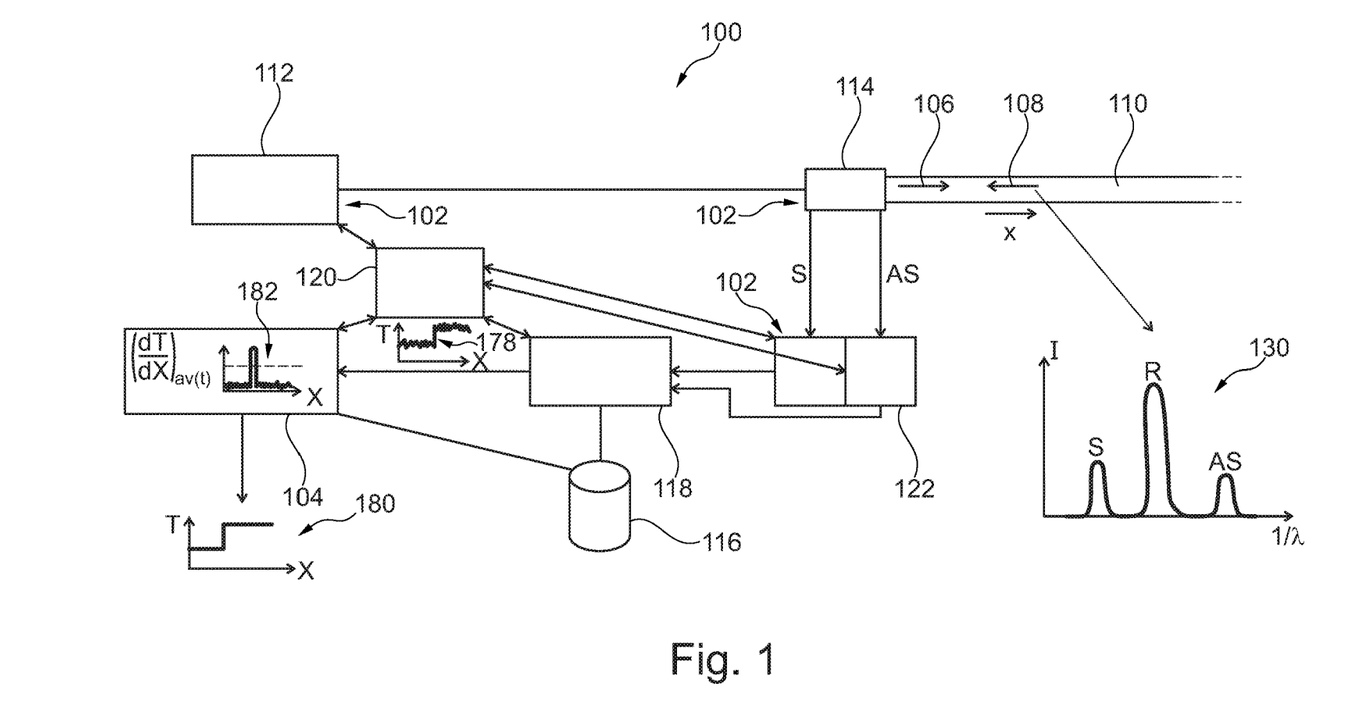
FIG. 1 illustrates a distributed sensing device according to exemplary embodiment of the invention.

FIG. 1 illustrates a distributed sensing device 100, configured as Distributed Temperature Sensing (DTS) device, according to an exemplary embodiment of the invention. The distributed sensing device 100 may be configured for determining a distribution of a temperature, T, as physical quantity along a spatial extension, x, of a measurement fiber 110. Additionally, the distribution of the temperature T may be measured as a function of time, t, by detecting measurement signals and subsequently calculating data from the measurement signals for different values of position x and different values of time t.

The distributed sensing device 100 may comprise a measuring unit 102 configured for measuring the signals, i.e. a Stokes signal S and an Antistokes signal AS as known from Raman theory, as a function of x and t. S and AS are correlated to the temperature T. More specifically, the measuring unit 102 may comprise an electromagnetic radiation source 112, such as a laser, to emit pulses (or more generally any stimulus pattern, for instance light with varying modulation frequency) of primary electromagnetic radiation 106, for instance in the near infrared wavelength range (for example with a wavelength between 850 nm and 1700 nm) and injects or couples them into the measurement fiber 110 of the measuring unit 102. The primary electromagnetic radiation 106 may then propagate along the measurement fiber 110. Backscattered secondary electromagnetic radiation 108 leaving the measurement fiber 110 may be detected by an electromagnetic radiation detector 122, such as a photodetector, which may also form part of the measuring unit 102. In the embodiment of FIG. 1, the electromagnetic radiation detector 122 may comprise a first detector unit for detecting the Stokes signal S and may comprise a separate second detector unit for detecting the Antistokes signal AS. Furthermore, a wavelength splitter 114 may be arranged with interfaces to the electromagnetic radiation source 112, the measurement fiber 110 and both detector units of the electromagnetic radiation detector 122, able to direct the Stokes signal S as a first measurement signal and the Antistokes signal AS as a second measurement signal to the respective detector unit. As can be taken from a diagram 130 plotting the detected intensity, I, in dependence of the reciprocal wavelength, 1/λ, the detectable data may comprise a Rayleigh signal (which is however usually not detected in DTS), R, resulting from elastic scattering, as well as the actually detected Stokes signal, S, and the actually detected Antistokes signal, AS, both resulting from inelastic scattering. The information may be detected for different values of x and for different values of t. The Stokes signal S and the Antistokes signal AS may be used as a basis for further calculations, as described below.

The raw signals as detected by the electromagnetic radiation detector 122 may be supplied to a determining unit 118 (which may be a processor or part of a processor) configured for determining, based on the measured signals, data being correlated to the physical quantity (i.e. temperature) over time and space. Thus, the determining unit 118 may determine a noisy temperature trace 178 based on the calculation of a logarithmic ratio of the measured Stokes signal S and Antistokes signal AS for different positions x along the measurement fiber 110. Detecting signals relating to different positions x may be accomplished by a time-of-flight analysis of individual detection signals relating to the same pulse. Detecting signals relating to different times t may be accomplished by analyzing detection signals relating to different, subsequently emitted pulses. The determining unit 118 may also calculate the temperature distribution over time (in particular, the DTS system may output trace by trace, for example every 10 seconds). The determining unit 118 may therefore be configured for determining the physical quantity T(x) and T(t), or T(x, t), based on the raw signals S, AS for different positions x and different times t.

The raw data (see reference numeral 178) derived from the measured signals by the determining unit 118 and still containing all noise may then be forwarded to a filtering unit 104 for smoothing it to suppress noise.

The filtering unit 104 (such as a processor or a part of a processor) may be configured for filtering the data being determined based on the signals S, AS to reduce noise or distortion and substantially preserve real features (such as hotspots or coldspots along the measurement fiber 110) based on filter parameters being determined depending on the data relating to a plurality of different times t (such as different points of time or different ranges of time, which may relate to different pulses emitted by the electromagnetic radiation source 112) and measured at a plurality of different positions (such as different spatial points or spatial ranges, each of which relating to a respective pulse emitted by the electromagnetic radiation source 112 and resulting in a time-spread response signal in view of the different times of flight of different portions of the pulse backscattered at different positions of the measurement fiber 110) along the measurement fiber 110. A database 116, which may be embodied as a mass storage device such as a hard drive or an electronic memory such as a random-access memory (RAM) or a flash memory, may be accessed by any of the filtering unit 104 and the determining unit 118, for instance to obtain data in terms of a filtering algorithm carried out by the filtering unit 104 for determining filter parameters and/or a data determining or signal analysis algorithm carried out by the determining unit 118 for determining the data from the signals. The filter parameters may be determined in a way to allow them to vary over the plurality of different times and over the plurality of different spatial positions. Based on these filter parameters, the raw data may then be modified or corrected to efficiently suppress noise and distortion, whereas data components related to real temperature events may remain substantially undisturbed. By taking this measure, use information included in the detected signal may be maintained while noise-based artifacts are suppressed or even eliminated. For this purpose, one or more filtering algorithms may be applied which dynamically consider(s) information included in the data itself as a basis for the determination of the way of filtering. Highly advantageously, information from the measurement signals (and data derived therefrom) measured for different times and measured for different spatial positions may be considered for the adjustment of the filtering. Data processing algorithms which may be applied for filtering or determining the filter parameters may include averaging the data over space and/or time, replacing sections of the data by approximating mathematical functions, replacing sections of the data by one or more fitted shapes (such as a polynomial function with polynomial coefficients as fitting parameters), and/or transforming sections of the data by a transformation (such as a wavelet transformation or a Kalman transformation).

However, the filtering unit 104 may advantageously omit or skip the filtering for one or more individuals section of the data determined over time and/or space, for which sections the occurrence of a real feature has been identified. By taking this measure, the filtering unit 104 may reduce noise but preserves real features by smoothing only a purely noisy part of the data while excluding another part of the data belonging to one or more identified real features from filtering. For identifying the occurrence of a real feature, it has turned out to be advantageous to analyze a first spatial derivative of the data over time and/or a first temporal derivative of the data over space, since an analysis in the domain of the first derivative may be more sensitive to small changes than an analysis in the data measurement domain.

More specifically, a time (t) averaged (av) spatial (x) derivative $(dT/dx)_{av(t)}$ of the temperature (T) trace (denoted with reference numeral 178) is indicated schematically with reference numeral 182 in FIG. 1. The time averaged spatial derivative of the temperature trace $(dT/dx)_{av(t)}$ may be determined by first calculating the first spatial derivative of T(x), i.e. by differentiating the function T(x) (see reference numeral 178) by the spatial position x along the fiber 110. This procedure may render real features or events better visible. This spatial derivative may be calculated for different times t. For each spatial position x, the value of the first derivative may thereafter be averaged over multiple different times t. This procedure may suppress noise so that the real features or events are even better visible (see reference numeral 182). In other words, calculating the spatial derivative may simplify the identification of a temperature event, in the shown example a temperature step along the fiber 110. Averaging the spatial derivative over time may simplify the subsequent identification of even small temperature events (out of the noise).

For identifying the occurrence of a real feature, the filtering unit 104 may search the recalculated data in form of the time averaged spatial derivative of the temperature trace $(dT/dx)_{av(t)}$ (compare reference numeral 182) for events in form of one or more data sections in which $(dT/dx)_{av(t)}$ (or more precisely the absolute value thereof) exceeds a predefined threshold value. Hence, the identification of a real feature (the temperature step in the described example) may be carried out based on a threshold analysis, as indicated with a horizontal dotted line in the diagram according to reference numeral 182.

Then, the raw data according to the diagram of reference numeral 178 may be filtered making use of information obtained from the threshold analysis of the diagram of reference numeral 182. In the shown example, filtering (for instance by spatially averaging of each two respectively neighbored data points in the diagram according to reference numeral 178) may be performed for the major part of the raw data but is omitted within a predefined range around the real feature identified as a "peak" by the threshold analysis in the diagram according to reference numeral 182 (this "peak" in the first derivative corresponds to the "step" in the original function). This may reduce noise while avoiding smearing out the temperature step by an undesired averaging around its position. The one or more determined filter parameters may define a degree according to which a corresponding part of the data is modified or corrected by the filtering. For instance, a part of the data for which the relative noise contribution may be identified as high and the real signal contribution is identified as low may be manipulated stronger than another part of the data for which the relative noise contribution may be identified as low and the real signal contribution is identified as high.

After filtering the raw measurement data for suppressing noise and thus relatively strengthening real features, the filtered and therefore improved measured data may be forwarded in the form of a smoothed temperature trace (see reference numeral 180) from the filtering unit 104 to a user interface (not shown) or to another destination. As can be taken from a comparison of the diagrams denoted with reference numerals 178 and 180, the described procedure may have reduced noise while maintaining the real feature in form of the temperature step.

As can be taken from FIG. 1, the entire measurement and temperature trace determination procedure may be controlled by a control unit 120.

In the following, examples of filtering according to exemplary embodiments of the invention will be described as Variant A, Variant B and Variant C. As a basis for this description, reference is made to various diagrams of FIG. 2 to FIG. 7 showing the effect of filtering noisy data, determined based on measured signals, with filter parameters determined based on the measurement signals or based on data derived therefrom.

Variant A, representing an exemplary embodiment of the invention, may widen a spatial resolution where feasible and may be denoted as a refined significance filter.

Figure 2:
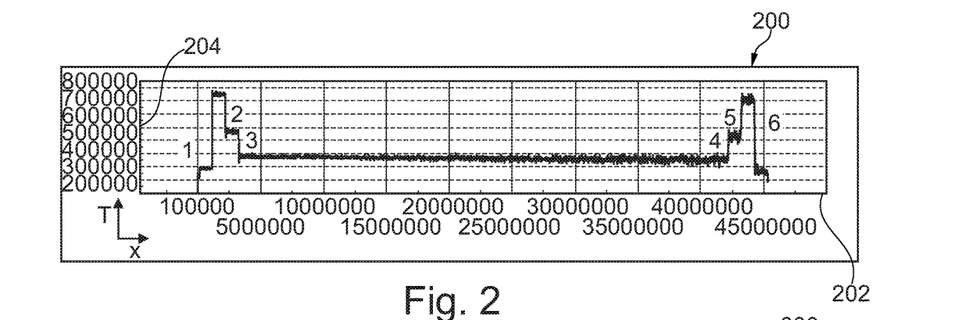
FIG. 2, FIG. 3, FIG. 4, FIG. 5, FIG. 6 and FIG. 7 illustrate diagrams showing the effect of filtering noisy data, determined based on measured signals, with filter parameters determined based on the measurement signals or based on data derived therefrom.

A diagram 200 shown in FIG. 2 has an abscissa 202 along which a position x of the measurement fiber or fiber 110 is plotted. Along an ordinate 204, the temperature T is plotted. The diagram 200 shows data in form of a trace of the temperature T over the extension x of the fiber 110. Six events or real features occur according to FIG. 2: At a temperature step 1, the temperature is increased to 90° C. At a temperature step 2, the temperature is decreased to 60° C. At a temperature step 3, the temperature is further decreased to 40° C. At a temperature step 4, the temperature is increased to 60° C. At a temperature step 5, the temperature is further increased to 90°. At a temperature step 6, the temperature is decreased again.

Figure 3:
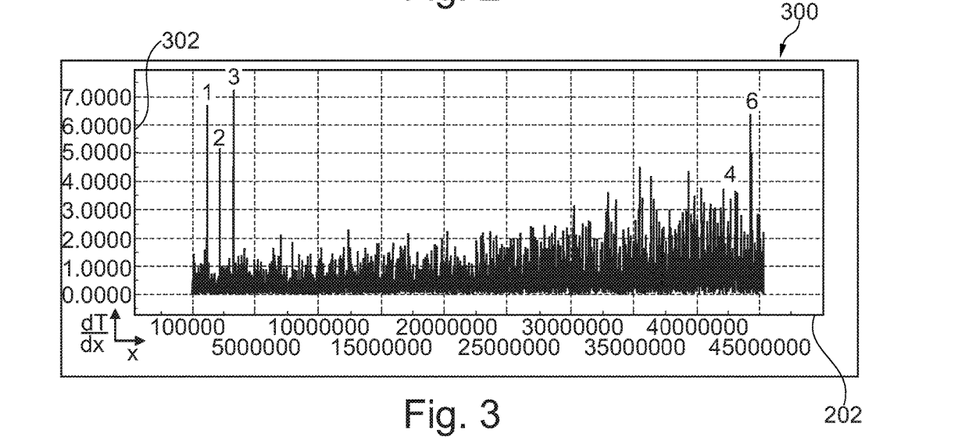

A diagram 300 shown in FIG. 3 has an abscissa 202 along which a position of the fiber 110 is plotted. Along an ordinate 302, a first spatial derivative of the temperature (dT/dx) is plotted. The diagram 300 shows changes of the temperature over the extension of the fiber 110. Although peaks 1, 2, 3 and 6 may still be resolvable in FIG. 3, peak 4 is difficult to identify and peak 5 is no more visible.

Figure 4:
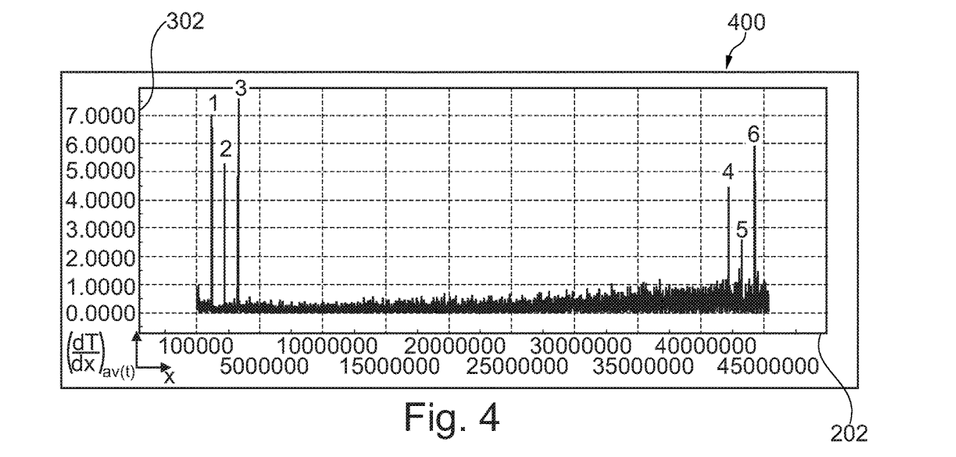

A diagram 400 shown in FIG. 4 corresponds to diagram 300 but shows a time-averaged first spatial derivative of the temperature (i.e. dT/dx, but averaged over time t), as calculated according to the exemplary embodiment of the invention. All peaks 1 to 6 are resolvable in FIG. 4 and can therefore be precisely identified as a basis for a meaningful decision in which spatial ranges the temperature trace according to FIG. 2 can be smoothed by filtering without smearing out the steps 1 to 6, and in which remaining portions filtering should be omitted. In other words, the temperature trace can be filtered by averaging, for a respective data point, data values at a number of neighbored points, while disabling this filtering selectively in respective spatial ranges around features 1 to 6 as identified from FIG. 3 (for instance by a threshold analysis).

According to the procedure of the embodiment of Variant A, spatial events (real changes) may be identified in the trace that significantly prevail over some time. For example, it may be possible to average over time the spatial-derivative of the trace and look for values significantly above the noise (for instance of the absolute value, or a signed value beyond an upper and lower limit). Then, a spatial smoothing over the current measured trace may be performed, but identified events are spared. In this context, the spatial derivative may be simply the difference between neighbor points or can be for example the difference between a trace strongly smoothed and a trace not (or only weakly) smoothed, or the difference to a fitted curve, etc. Generally, any function of the data over space and/or time indicative for an event may be used. A temporal-derivative may be determined correspondingly.

This may have the benefit that by averaging over time, the derivative for identification of events lowers the noise while preserving events. Consequently, an improvement of the signal-to-noise ratio can be obtained which allows for a better identification of events and a more reliable selection of the filter strength at each location.

Such an embodiment is visualized in FIG. 2 to FIG. 4: Detection or identification of all six events (temperature steps in the trace according to FIG. 2 and denoted with numbers 1 to 6) from a single derivative over space (see curve in FIG. 3) may be difficult: in the shown example, step 5 is drowning in the noise according to FIG. 3. But from the time-averaged derivative over some time (here 16 traces) all six events 1 to 6 can easily be discriminated (and spared from filtering which here would make the steps less crisp), compare FIG. 4.

FIG. 4 therefore shows that an identification of potential events (such as temperature events, in the shown embodiment temperature steps) can be significantly simplified and rendered more accurate (as compared to FIG. 3) by time-averaging a spatial derivative of the temperature trace. Such an identification may be carried out based on a threshold analysis of the curve shown in FIG. 4, for instance identifying an event in portions in which the curve has a value above a predetermined threshold value. A subsequent filtering (for instance by carrying out an averaging routine) of the temperature trace of FIG. 2 can be limited to spatial ranges apart from (or being sufficiently far away from) the identified potential events. More specifically, filtering by averaging may be performed everywhere apart from spatial positions relating to steps 1, 2, 3, 4, 5, and 6.

Figure 5:
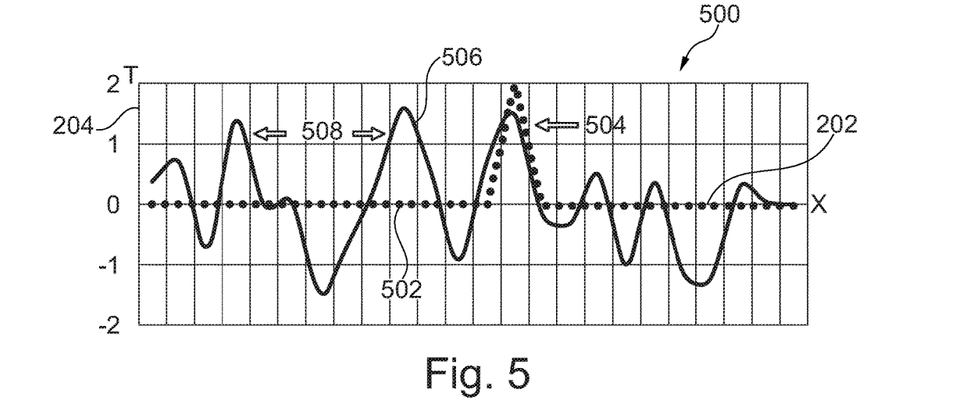
Figure 6:
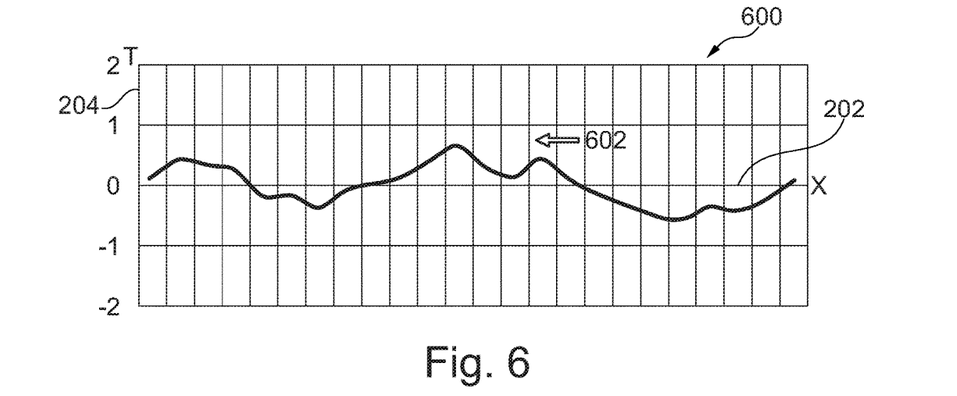
Figure 7:
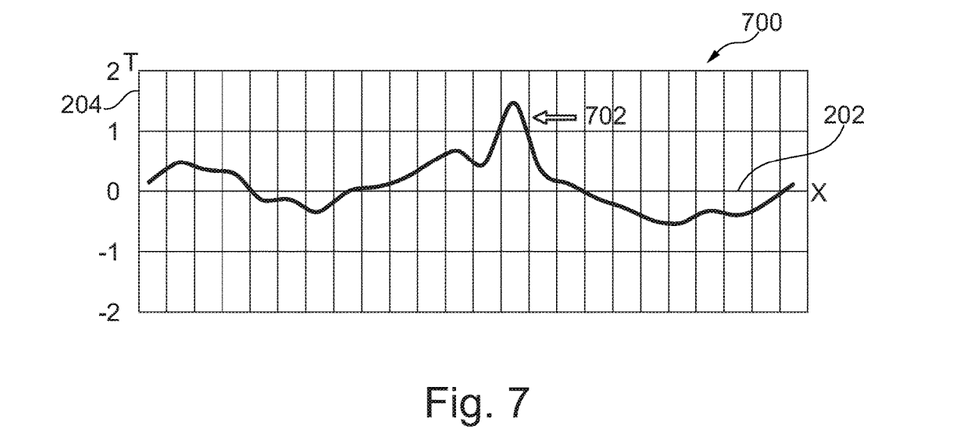

While FIG. 2 to FIG. 4 show an example of signal modification on the basis of measured data, another intuitive but synthetic example is illustrated in FIG. 5 to FIG. 7. FIG. 5 to FIG. 7 relate to a spatially sharp and temporally prevailing hot spot (i.e. existing for some time) can be detected (not smoothed over space) even if it is small compared to the noise.

Diagram 500 illustrated in FIG. 5 corresponds to FIG. 2 and shows an original trace. FIG. 5 compares a first curve 502, relating to reality and comprising a weak temperature event 504 which remains visible over some time, with a measured curve 506, which comprises noise-related artifacts 508.

Diagram 600 shown in FIG. 6 illustrates a trace according to measured curve 506 filtered uniformly over the entire spatial extension because the real event could not be unambiguously found within the noise. As can be taken from reference numeral 602, the real event (compare reference numeral 504 in FIG. 5) may be filtered out. The filtered temperature trace according to FIG. 6 may be obtained by filtering the temperature trace according to FIG. 5 using a temperature event identification scheme corresponding to FIG. 3.

Diagram 700 shown in FIG. 7 illustrates a filtered trace as obtained according to an exemplary embodiment of the invention. As can be taken from reference numeral 702, the real event (compare reference numeral 504 in FIG. 5) is now preserved in the filtered data. The filtered temperature trace according to FIG. 7 may be obtained by filtering the temperature trace according to FIG. 5 using a temperature event identification scheme corresponding to FIG. 4.

According to Variant B, representing another exemplary embodiment of the invention, the effective measurement time may be increased where feasible. Compared to Variant A, the roles of space and time may be exchanged according to Variant B: In a corresponding procedure, significant events may be identified in time by looking at each location for events (changes in time) that significantly prevail over some spatial range (for example by averaging over space the temporal-derivative of the traces). Then, a temporal smoothing may be performed (for instance by averaging the temperature at the respective position over some traces) on each position of the current measured trace, but positions or regions of identified events may be spared or may be omitted from the smoothing (i.e. they are not averaged over longer time).

According to Variant C, representing a further exemplary embodiment of the invention, Variant A and Variant B may be combined. Although Variant A may be a very powerful in improving data quality, a limitation of Variant A may be that detected events (change over space) show full noise because they are not averaged over space (for example the height of a hotspot would strongly fluctuated from trace to trace).

Figure 10:
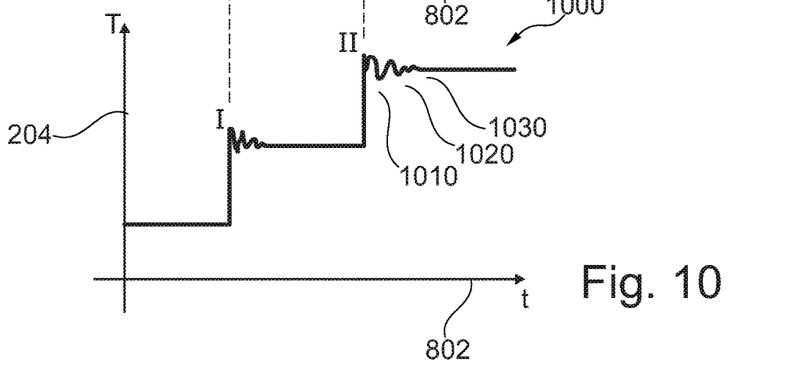

Although also Variant B may be a very powerful in improving data quality, a limitation in Variant B may be that detected events (change over time) show full noise not averaged over time (i.e. a section of rapid temperature change will look noisy as seen in FIG. 10).

An advantage of a combination of Variant A and Variant B may be that an identified slowly changing hotspot that is therefore not smoothed over space (as described in Variant A) may still be smoothed over time, thus a less noisy result than according to Variant A alone may be obtained.

Accordingly, an identified broad quickly changing event that is therefore not smoothed over time (as described in Variant B) may still be smoothed over space, thus the result may be less noisy than in Variant B alone.

Figure 8:
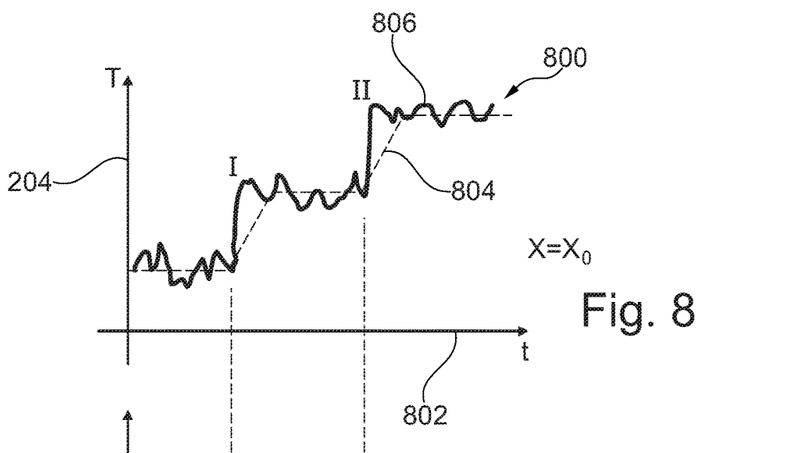
FIG. 8, FIG. 9 and FIG. 10 illustrate diagrams showing the effect of filtering measurement data with filter parameters determined based on the measurement data according to an exemplary embodiment of the invention.
Figure 9:
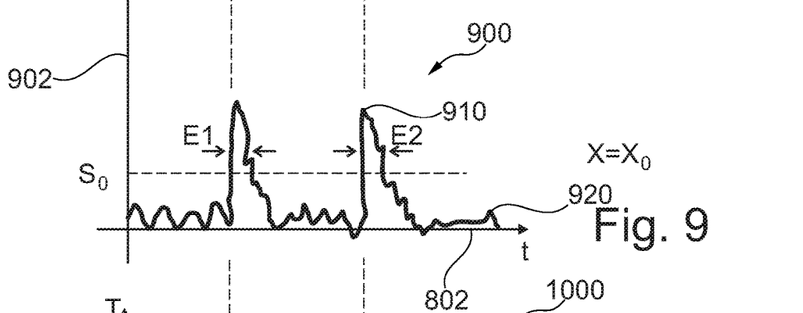

FIG. 8, FIG. 9 and FIG. 10 illustrate diagrams 800, 900, 1000 showing the effect of filtering measurement data with filter parameters determined based on the measurement data according to another exemplary embodiment of the invention.

A diagram 800 shown in FIG. 8 has an abscissa 802 along which a measurement time (for a fixed position $x_0$ of the fiber 110) is plotted. Along ordinate 204, the temperature T is plotted. The diagram 800 shows a raw trace 806 of the temperature over the time of measurement (or trace number; in DTS, a measurement time may be a (for instance 10 seconds) data acquisition time, corresponding to a trace rate) for a fixed position of the fiber 110. At a temperature step I, the temperature is increased. At a temperature step II, the temperature is further increased. Reference numeral 804 indicates data calculated for a very long averaging time (corresponding to reference numeral 1104 in FIG. 11). In other words, the curve according to reference numeral 804 can be obtained by averaging the raw trace 806 regardless of any events (such as step I or step II). Averaging according to reference numeral 804 may be asymmetric with regard to the events, since the temporal averaging only considers the past.

A diagram 900 shown in FIG. 9 has an abscissa 802 along which a time of measurement (for a fixed position $x_0$ of the fiber 110) is plotted. Along an ordinate 902, the absolute value of the difference between the curves 806 and 804 (i.e.

the absolute value of the difference between raw trace and uniformly averaged trace) is plotted for the fixed position $x_0$. The diagram 900 shows two temporal changes of the temperature at the fixed position $x_0$. Temperature events, i.e. steps I and II, can be identified from diagram 900 as ranges E1 and E2 at which the value plotted along the ordinate 902 exceeds a predetermined threshold value $S_0$. According to FIG. 9, the shown curve can be averaged over spatially neighbored points (which can suppress noise), or not. Reference numeral 910 relates to a high level which indicates the need for a short averaging time. Correspondingly, reference numeral 920 relates to a low level which indicates that a long averaging time can be used.

The identification of events according to FIG. 9 can be considered when determining temperature ranges during which the curve according to diagram 800 may be to be filtered for improving the appearance of the temperature trace. In the shown embodiment, filtering by averaging neighbors (previous) point of the temperature trace according to FIG. 8 may be limited to times apart from temporal ranges E1 and E2 in which temperature events (i.e. steps I and II) have been identified. As can be taken from FIG. 10, noise may be reduced by the averaging while protecting the temperature steps I and II from being smeared out by an undesired averaging. It can be seen in FIG. 10 that, around the events according to steps I, II, there is still some noise left (since the averaging window needs to open first). Reference numeral 1010 relates to a shortest calculated averaging time. Reference numeral 1020 relates to an intermediate calculated averaging time. Reference numeral 1030 relates to a longest calculated averaging time.

FIG. 11 illustrates a diagram 1100 showing a degree of filtering (which may also be denoted as a weighting function), see reference numeral 1106, used for filtering at and around a real feature of a temperature trace according to an exemplary embodiment of the invention. The degree of filtering (in particular a weighting function) also defines the corresponding filter parameters.

Abscissa 202 and a first ordinate 204 according to FIG. 11 correspond to abscissa 202 and ordinate 204 according to FIG. 5, i.e. show a space-temperature dependence (at one time). Additionally, FIG. 11 shows a second ordinate 1180 which relates to the degree of filtering and is denoted as "α" in FIG. 11. A first curve 1102 corresponds to unfiltered data, i.e. corresponds to curve 506 in FIG. 5 (but here for better clarity of explanation shown without noise) and shows a slanted temperature step as a real feature. A second curve 1104 corresponds to the result of a uniform filtering of the first curve 1102 by uniformly averaging the first curve 1102 before, during and after the slanted temperature step, i.e. filtering the first curve 1102 in the same way (i.e. with the same filter parameters) in a portion relating to the real feature and in other portions being free of the real feature. A third curve 1106 may be obtained by calculating the absolute value of the difference between the first curve 1102 and the second curve 1104. The third curve 1106 (advantageously averaged over time) may be indicative of the filter parameters according to which the filtering according to the presently described embodiment of the invention is carried out.

The third curve 1106 can be denoted as a degree of filtering which indicates to which amount the first curve 1102 and to which other amount the second curve 1104 has an influence on the filtering. Referring to FIG. 11, the filter parameters may be determined substantially exclusively based on the second curve 1104 in sections 1110 of the third curve 1106 in which the third curve 1106 has a very low value. Correspondingly, the filter parameters may be determined exclusively based on the first curve 1102 in sections 1120 of the third curve 1106 in which the third curve 1106 has a high value (with regard to the noise floor). In intermediate sections of the third curve 1106 in which the third curve 1106 assumes values between the high value and the low value, the filtering may be based on a weighted combination or mixture of the first curve 1102 and the second curve 1104. As an alternative to weighting, the third curve 1106 may determine the width of an averaging window (at a low value of the third curve 1106, the averaging width is larger, and vice versa). In a nutshell, the intensity or degree of filtering of a section of the first curve 1102 may be the smaller, the larger a deviation between a filtered data value from an original (or unfiltered) data value would be. In other words, the intensity or degree of filtering of a section of the first curve 1102 may be the larger, the smaller the effect of the filtering would be. It can therefore be prevented that the filtering changes the value in an exaggerated or oversignificant way.

In particular, it may be possible to calculate the third curve 1106 for each of the different times and to average the various third curves 1106 over time (in another embodiment, it may also be possible to average different first curves 1102 corresponding to different times over time, and to subsequently calculate the third curve 1106 based on the averaged first curve 1102).

More generally, the third curve 1106 may be the difference between filtered and not (or less) filtered data (as shown here), or the first or higher derivative of the data. The third curve 1106 may say for each location to which degree (for instance how many percent) the original data shall be filtered or weighted to the filtered trace in the final result (in case of filtering by averaging). The third curve 1106 may alternatively indicate the averaging window size for each point (e.g. if at the low value then use the width as in the second curve 1104; if larger, then decrease the size).

Figure 12:
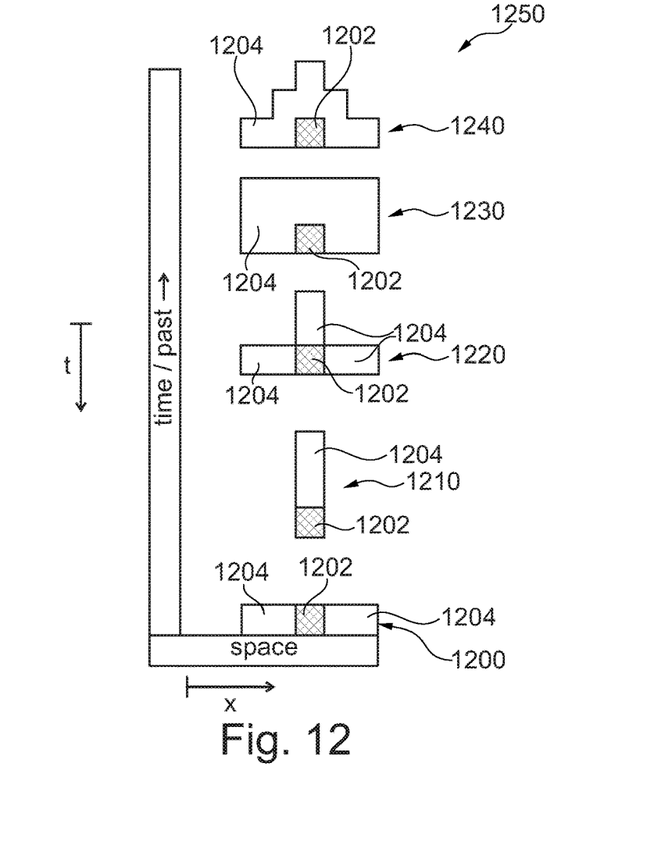
FIG. 12 is a diagram illustrating procedures of averaging data in accordance with filtering procedures according to various exemplary embodiments of the invention.

FIG. 12 is a diagram 1250 illustrating procedures of averaging data in accordance with filtering procedures according to various exemplary embodiments of the invention.

Along a horizontal axis of FIG. 12, the space x is plotted. Along a vertical axis of FIG. 12, the time t is plotted (a direction upwardly according to FIG. 12 corresponds to a temporal direction back to the past). Reference numeral 1202 indicates a data point to be calculated (per space and time). Reference numeral 1204 indicates a number of neighbored data points included in a respective averaging procedure (wherein each of these neighbored data points may be considered for the averaging procedure with the same weight or with different weights, for instance weighting neighbored data points with a smaller distance to a data point to be calculated stronger than neighbored data points with a larger distance to a data point to be calculated).

Reference numeral 1200 corresponds to a scenario in which no real features are identified over space, and the averaging is carried out over a symmetric (with regard to the data point to be calculated) spatial range.

Reference numeral 1210 corresponds to a scenario in which no real features are identified over time, and the averaging is carried out over a temporal range related only to the past compared to the data point to be calculated.

Reference numeral 1220 corresponds to a scenario in which no real features are identified neither over time nor over space, and the averaging is carried out over a temporal range (according to reference numeral 1210) and over a spatial range (according to reference numeral 1200).

Reference numerals 1230 and 1240 relate to the same scenario as reference numeral 1220, but apply alternative averaging procedures in terms of a number of neighbored data points considered for the averaging.

It should be noted that the term "comprising" does not exclude other elements or steps and the "a" or "an" does not exclude a plurality. Also elements described in association with different embodiments may be combined.

The invention claimed is:

1. A distributed sensing device for determining a physical quantity, the device comprising:
   a measuring unit configured for measuring signals over time and space by distributed sensing;
   a determining unit configured for determining, based on the measured signals, data being correlated to the physical quantity; and
   a filtering unit configured for filtering the data to reduce noise and substantially preserve real features based on at least one filter parameter which is determined depending on the data which relate to the physical quantity at a plurality of different times,
   wherein the filtering unit is configured for determining the at least one filter parameter depending on the data which relate to the physical quantity at the plurality of different times and at a plurality of different spatial positions.

2. The device according to claim 1, wherein the filtering unit is configured for determining the at least one filter parameter varying over the plurality of different times and varying over the plurality of different spatial positions.

3. The device according to claim 1, wherein the filtering unit is configured for filtering the data by averaging at least a part of the data over at least one of space and time.

4. The device according to claim 1, wherein the filtering unit is configured for filtering the data by replacing at least a part of the data by at least one parameterizable function.

5. The device according to claim 1, wherein the filtering unit is configured for filtering the data by replacing at least a part of the data by at least one fitted shape.

6. The device according to claim 1, wherein the filtering unit is configured for filtering the data by transforming at least a part of the data by a transformation, the transformation including at least one of the group consisting of a wavelet transformation, and a Fourier transformation.

7. The device according to claim 1, wherein the filtering unit is configured for filtering the data by carrying out Kalman filtering.

8. The device according to claim 1, wherein the filtering unit is configured for changing, by one of omitting or reducing, the filtering for a part of the data for which or around which the occurrence of a real feature is identified.

9. The device according to claim 1, wherein the filtering unit is configured for filtering the data in accordance with a degree of filtering determined based on an absolute value of a difference, between the unfiltered data and the data being uniformly filtered regardless of an occurrence of a real feature.

10. The device according to claim 9, wherein the filtering unit is configured for performing the filtering based on the degree of filtering in such a way that:
    the filtering changes respective data portions the larger, the smaller the difference; and/or
    the filtering changes respective data portions the smaller, the larger the difference for the respective data portion.

11. The device according to claim 9, wherein the filtering unit is configured for determining the degree of filtering based on a difference between the unfiltered spatial data averaged over time and the uniformly filtered spatial data averaged over time.

12. The device according to claim 1, wherein the filtering unit is configured for identifying the occurrence of a real feature based on an analysis of a spatial derivative and/or a temporal derivative, of the data,
    wherein advantageously the filtering unit is configured for identifying the occurrence of a real feature by averaging over space and/or time, the derivative of the data, and
    wherein more advantageously the filtering unit is configured for identifying the occurrence of a real feature by averaging a spatial derivative of the data over time, and/or by averaging a time derivative of the data over space.

13. The device according to claim 1, wherein the filtering unit is configured for identifying the occurrence of a real feature based on a pattern recognition analysis applied to the data, wherein the pattern recognition analysis is based on a cross correlation between a respective portion of the data and a predefined pattern being indicative of a real feature.

14. The device according to claim 1, wherein the at least one filter parameter is indicative of a degree according to which a corresponding part of the data is modified by the filtering.

15. The device according to claim 1, wherein the filtering unit is configured for reducing noise and substantially preserving real features by smoothing a part of the data which does not belong to at least one identified real feature in a more pronounced way than another part of the data belonging to at least one identified real feature.

16. The device according to claim 1, wherein the physical quantity is at least one of the group consisting of a temperature, a temperature distribution, a strain, a strain distribution, and a vibration-related quantity at or along a fiber of the distributed sensing device, respectively.

17. The device according to claim 1, wherein the distributed sensing device is configured as one of the group consisting of a Distributed Temperature Sensing device, a Distributed Acoustic Sensing device, a Distributed Temperature and Strain Sensing device, and a Distributed Vibration Sensing device.

18. A method of determining a physical quantity by distributed sensing, the method comprising:
    measuring signals over time and space by distributed sensing;
    determining, based on the measured signals, data being correlated to the physical quantity; and
    filtering the data to reduce noise and substantially preserve real features based on at least one filter parameter which is determined depending on the data which relate to the physical quantity at a plurality of different times,
    wherein determining the at least one filter parameter depending on the data which relate to the physical quantity at the plurality of different times and at a plurality of different spatial positions.

19. A non-transitory computer-readable medium, in which a computer program for determining a physical quantity by distributed sensing is stored, or a program element for determining a physical quantity by distributed sensing,
    wherein the computer program or the program element, when being executed by a processor, is adapted to carry out or control a method, comprising:
    measuring signals over time and space by distributed sensing;

determining, based on the measured signals, data being correlated to a physical quantity; and filtering the data to reduce noise and substantially preserve real features based on at least one filter parameter which is determined depending on the data which relate to the physical quantity at a plurality of different times and at a plurality of different spatial positions.

* * * * *